US008635429B1

(12) United States Patent
Naftel et al.

(10) Patent No.: US 8,635,429 B1
(45) Date of Patent: Jan. 21, 2014

(54) METHOD AND APPARATUS FOR MAPPING VIRTUAL DRIVES

(75) Inventors: Timothy Michael Naftel, Longmont, CO (US); David Teater, Minneapolis, MN (US)

(73) Assignee: Symantec Corporation, Mountain View, CA (US)

( * ) Notice: Subject to any disclaimer, the term of this patent is extended or adjusted under 35 U.S.C. 154(b) by 1264 days.

(21) Appl. No.: 12/057,002

(22) Filed: Mar. 27, 2008

Related U.S. Application Data

(63) Continuation-in-part of application No. 11/824,478, filed on Jun. 29, 2007.

(51) Int. Cl.
*G06F 12/10* (2006.01)
*G06F 12/16* (2006.01)

(52) U.S. Cl.
USPC ............... 711/206; 711/162; 711/E12.058; 711/E12.103

(58) Field of Classification Search
None
See application file for complete search history.

(56) References Cited

U.S. PATENT DOCUMENTS

| 6,141,773 | A | 10/2000 | St. Pierre et al. ............... 714/20 |
| 6,968,350 | B2 * | 11/2005 | Traut et al. ............................ 1/1 |
| 7,440,965 | B1 * | 10/2008 | Pruthi et al. .......................... 1/1 |
| 7,669,020 | B1 * | 2/2010 | Shah et al. ..................... 711/162 |
| 7,707,185 | B1 | 4/2010 | Czezatke et al. .............. 707/649 |
| 7,774,391 | B1 * | 8/2010 | Le et al. ......................... 707/822 |
| 2004/0078636 | A1 | 4/2004 | Suzaki .............................. 714/6 |
| 2005/0160150 | A1 | 7/2005 | Kao ............................... 709/212 |
| 2005/0228950 | A1 | 10/2005 | Karr .............................. 711/114 |
| 2006/0130074 | A1 * | 6/2006 | Kumar .......................... 719/324 |

* cited by examiner

*Primary Examiner* — Denise Tran
(74) *Attorney, Agent, or Firm* — Campbell Stephenson LLP

(57) ABSTRACT

A method and apparatus for mapping virtual drives is described. In one embodiment, the method for mapping virtual drives comprises processing first locations of a plurality of file system objects within a virtual volume and converting the first locations of the plurality of file system objects within the virtual volume into second locations of the plurality of file system objects relative to a virtual drive of at least one virtual drive, wherein the at least one virtual drive form a portion of the virtual volume.

20 Claims, 5 Drawing Sheets

METHOD AND APPARATUS FOR MAPPING VIRTUAL DRIVES

CROSS-REFERENCE TO RELATED APPLICATIONS

This application is a continuation-in-part of co-pending U.S. patent application Ser. No. 11/824,478 filed Jun. 29, 2007 and entitled "Method and Apparatus for Mapping Virtual Drives." The aforementioned commonly-assigned related patent application is herein incorporated by reference.

BACKGROUND OF THE INVENTION

1. Field of the Invention

Embodiments of the present invention generally relate to virtualization technologies. More particularly, the present invention relates to a method and apparatus for mapping virtual drives.

2. Description of the Related Art

People (e.g., employees) utilize various computing environments (e.g., MICROSOFT WINDOWS XP, APPLE MACINTOSH OS, REDHAT GNU OS, and the like) to perform various tasks and functions (e.g., job-related duties). For example, a computer running MICROSOFT WINDOWS XP may be used to create a presentation while a computer running REDHAT GNU OS may be used to render computer graphics. Traditionally, a host computer could only operate one computing environment (e.g., an operating system supporting application software and device drivers) at a time.

Virtualization enables the creation of multiple computing environments on a single host computer. Hence, one host computer supports numerous and/or different computing environments for various applications or users (e.g., remote users). Virtualization may be accomplished by a virtualization manager (Hypervisor) and one or more virtual machines, each comprising an operating system and application software resident on the host computer.

Generally, the virtual machine refers to software that creates a virtualized environment between the computer platform and its operating system, so that the end user can operate software on an abstract machine. The virtual machine allows applications written for one OS to be executed on a machine which runs a different OS or provide execution "sandboxes", which provide a greater level of isolation between processes than is achieved when running multiple processes on the same instance of an OS. Another use is to provide multiple users the illusion of having an entire computer, one that is their "private" machine, isolated from other users, all on a single physical machine. Another advantage is that booting and restarting a virtual machine is much faster than a physical machine, since it may be possible to skip tasks such as hardware initialization.

The virtual machine may be represented by a computer image (e.g., an image file stored in a computer memory) that comprises information for starting and operating the virtualized environment on the host computer. Generally, the virtual machine image comprises device drivers, operating system files, various data as well as a number of software packages for virtualizing hardware and software of the host computer. The virtual machine generated by executing the virtual machine image communicates with one or more virtual disks (e.g., one or more Virtual Machine Disk (VMDK) files that store the contents of a data storage container) through various interfaces (e.g., Small Computer System Interface (SCSI)) in a manner similar to a physical data storage container (e.g., hard disk).

Generally, each virtual disk (e.g., VMDK, VHD and the like) comprises multiple blocks of data that are accessible by a guest operating system running on the virtual machine. The multiple blocks of data are arranged using a variety of techniques (e.g., flat files, sparse files and the like). The guest operating system is configured to create partitions, logical drives, dynamic disks and volumes within the virtual disks for use by the virtual machine. Additionally, the guest operating system is configured to create a disk array using the virtual disks (e.g., any type of Redundant Array of Independent/Inexpensive Disks (RAID) configuration) using hardware and/or software configured to arrange the file data on the virtual disks in a manner similar to the physical disks. Generally, a RAID configuration is a disk array in which a portion of the virtual storage capacity is used to store redundant information regarding the file data stored on the remainder of the virtual storage capacity. The redundant information enables regeneration of the file data in the event that a member virtual disk of the disk array or an access path to the member virtual disk fails. For example, a volume using a RAID-5 configuration has file data striped across the virtual disks.

Computer System Administrators of organizations that employ virtualization technologies desire to backup and restore virtual machines as well as any file system objects (e.g., files and directories) associated with the guest operating system. As mentioned above, an image file is used to store the virtual machine. The image file is generated and stored on a Storage Area Network (SAN) by backup proxy software. If the virtual machine (e.g., file data within the virtual machine) is needed at a later date, the backup proxy software must first restore the entire virtual machine and then mount the virtual machine to backup individual files and directories.

Therefore there is a need in the art for a method and apparatus for mapping virtual drives to enable individual file data access and restoration without backing up an image for a virtual machine.

SUMMARY OF THE INVENTION

Embodiments of the present invention generally comprise a method and an apparatus for mapping virtual drives. In one embodiment, the method for mapping virtual drives comprises processing first locations of a plurality of file system objects within a virtual volume and converting the first locations of the plurality of file system objects within the virtual volume into second locations of the plurality of file system objects relative to a virtual drive of at least one virtual drive, wherein the at least one virtual drive forms a portion of the virtual volume.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
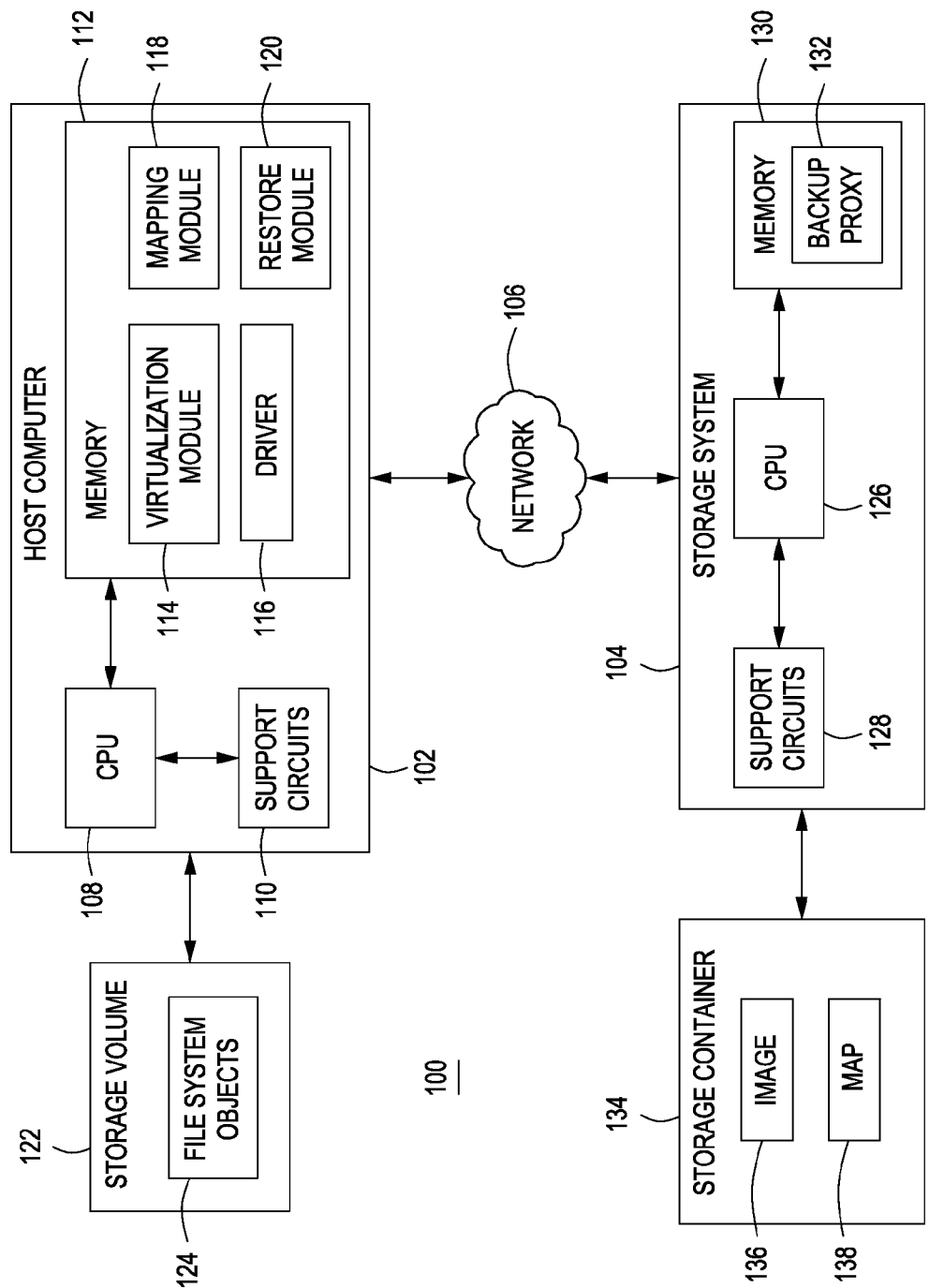
FIG. 1 is a block diagram of a system for mapping virtual drives according to one or more embodiments of the present invention.

FIG. 1 is a block diagram of a system 100 for mapping virtual drives according to one or more embodiments of the present invention. The system 100 comprises a host computer 102 and a storage system 104 that are coupled to each other through a network 108.

The host computer 102 is a computing device (e.g., a laptop, a desktop, a Personal Desk Assistant (PDA), a tablet, a mobile phone and the like) that comprises a central processing unit (CPU) 108, various support circuits 110 and a memory 112. The CPU 108 may comprise one or more commercially available microprocessors or microcontrollers that facilitate data processing and storage. Various support circuits 110 facilitate operation of the CPU 108 and may include clock circuits, buses, power supplies, input/output circuits and/or the like. The memory 112 includes a read only memory, random access memory, disk drive storage, optical storage, removable storage, and the like. The memory 112 includes various software packages, such as a virtualized module 114, a driver 116, a mapping module 118, a restore module 120.

Generally, the virtualization module 114 is software that generates a virtualized computing environment and executes one or more virtual machines (e.g., a guest operating system and one or more virtual disks) on the host computer 102. The virtualization module 114 is configured to emulate various resources (e.g., processors, memory devices, buses, networking components and the like) of the host computer 102 for use by the virtualized computing environment. The virtualization module 114 couples the virtualized computing environment with the host computer 102 by translating commands and operations of the virtualized computing environment into equivalent commands and operations at the host computer 102.

Furthermore, the host computer 102 is coupled to a storage volume 122 that comprises a plurality of file system objects 124, hereinafter, referred to as the file system objects 124. The file system objects 124 may be files and directories organized in accordance with a file system (e.g., LINUX, NTFS, FAT and the like). In one embodiment, locations of one or more portions (e.g., extents) of the file system objects 124 are indicated by a Master File Table (MFT) in a NTFS file system. In one embodiment, the storage volume 122 is a storage disk array (e.g., an array of hard disks) in a form of a Redundant Array of Inexpensive Disks (RAID) configuration.

The storage system 104 is a configuration of various hardware and software for facilitating access to stored data. The storage system 104 comprises a plurality of computing devices (e.g., servers) and a plurality of storage containers (e.g., online storage (disk) and/or offline storage (tape or optical)). The storage system 104 may form a portion of a Storage Area Network (SAN) in which the plurality of computing devices and the plurality of storage devices are connected to a Fibre Channel switch or hub. Each computing device in the SAN is granted full read/write access to any storage container within the SAN. This allows for LAN-free, Client-free, and Server-free backups.

In one embodiment, the storage system 104 comprises a computing device that comprises a central processing unit (CPU) 126, various support circuits 128 and a memory 130. The CPU 126 may comprise one or more commercially available microprocessors or microcontrollers that facilitate data processing and storage. The various support circuits 128 facilitate operation of the CPU 126 and comprise at least one of clock circuits, power supplies, cache, input/output circuits, and the like. The memory 130 comprises at least one of read only memory (ROM), random access memory (RAM), disk drive storage, optical storage, removable storage, and the like. The memory 130 further comprises various software packages, such as a backup proxy 132.

In addition, the storage system 104 is coupled to a storage container 134. The storage container 134 may comprise at least one of a disk drive, a disk drive array, an optical storage system, a tape drive or the like. The storage container 134 further comprises an image 132 and a map 134. The image 132 is an image file of a virtual machine (e.g., a virtual disk) that operates in the virtualized environment (e.g., guest operating system) on the host computer. As explained further below, the image 132 comprises a configuration file (e.g., a descriptor file, VMWARE .vmx file) and one or more virtual drive files (e.g., VMWARE .vmdk files) according to one or more embodiments. The one or more virtual drive files represent a virtual volume associated with the guest operating system. Furthermore, the map 134 comprises mappings of files relative to the virtual drive files (e.g., addressing from a first sector to a last sector in a virtual drive file), which were translated from mappings of the files relative to the virtual volume (e.g., addressing from a first sector to a last sector of a partition, physical volume, dynamic disk or a logical volume).

The backup proxy 132 is software configured to backup a virtual machine that runs on the host computer 102. For example, the backup proxy 132 generates an image file (i.e., the image 136) that represents the one or more virtual disks of the virtual machine at a particular moment in time. Then, the backup proxy 132 retrieves the image 136 from across the SAN and stores the image 136 in the storage container 134.

The driver 116 is software configured to interact with and examine information within the virtual drive files. As such, the driver 116 interprets a format of the virtual drive files. The format of the virtual drive files indicates the organization of the data within the virtual drive files. The driver 116 may be used to map a logical address of an extent to a physical address of the extent where both the logical address and the physical address are relative to the virtual volume. For example, the driver 116 determines if the virtual drive files are formatted as FLAT files, SPARSE files or Virtual Machine File System (VMFS) files. Generally, a FLAT file allocates space in advance and comprises data that is read or written sequentially without any structurally relationships. On the other hand, a SPARSE file allocates space for data as space is needed and not in advance. Hence, data within the sparse file is organized by header information, as described below, which comprises grain directories and grain tables for grains (e.g., a number of sectors). Accordingly, the driver 116 reads and analyzes the header information to determine locations (e.g., offsets) of the grains that comprise the data stored within the virtual drive files according to one embodiment. In another embodiment, the driver 116 maps a Virtual Machine File System (VMFS) volume into a NTFS volume on a raw image or a block device.

The driver 116 and the mapping module 118 cooperate to convert first locations of the file system objects 124 (e.g., files and directories) relative to the virtual volume (e.g., a RAID-5 NTFS volume) into second locations of the file system objects 124 relative to the virtual drive files. In one embodiment, the mapping module 118 creates the map 138 for storing the second locations as mappings between the file system objects 124 and a plurality of extents relative to the virtual drive files. In one embodiment, a location of an extent (e.g., a contiguous area of computer memory in the perspective of the virtual volume) of a file is an offset (e.g., a number of bytes or sectors) relative to a beginning of the virtual volume (e.g., volume boundary), which is translated by the mapping module 118 and/or the driver 116 into one or more offsets of one or more portions of the extent relative to the virtual drive files that represent the virtual volume.

According to one embodiment, the mapping module 118 analyzes configuration information (e.g., a descriptor file) associated with the virtual disk to identify the virtual drive files. Moreover, the configuration information may indicate a size, an offset and/or a (disk) region of each virtual drive file in the virtual disk. The disk region refers to an area of the virtual disk defined by disk geometry (e.g., tuples of cylinder, head and sector). The size and the offset may be provided in disk geometry or a number of sectors. As such, the mapping module 118 determines a location of a first and/or last sector of each virtual drive file. Based on the configuration information, the mapping module 118 determines a layout of the virtual disk with respect to the virtual drive files. Hence, the mapping module 118 is able to associate a range of sectors or a disk region with a particular virtual drive file. In addition, the configuration information may indicate a format of the virtual drive files, which is interpreted by the driver 116 and used by the mapping module 118 to determine the second locations, as described above.

In one embodiment, the mapping module 118 resolves one or more volumes within the image 136 using partition information (e.g., a Master Boot Record). The mapping module 118 may use the driver 116 to access the partition information from the image 136 (e.g., if the partition information is stored in a sparse file). The mapping module 118 determines volume boundaries from the partition information. For example, the Master Boot Record comprises entries associated with primary and secondary partitions of a disk (e.g., virtual disk or physical disk). The primary partitions may be defined by locations (e.g., cylinder-head-sector addresses or logical addresses) of first and/or last sectors of each primary partition as well as a size (in bytes or sectors) of each primary partition. The secondary partitions may be defined by metadata that describe one or more logical partitions with each secondary partition. In one embodiment, the metadata is stored in a last one Megabyte of the virtual disk that is used for holding configuration data that describes locations one or more logical volumes for a Logical Disk Manager. In another embodiment, the metadata is stored in a first sector of an Extended Boot Record (EBR) partition table for each logical partition within an extended partition where the metadata indicates locations (e.g., offsets) of the logical partitions.

Accordingly, the mapping module 118 analyzes the partition tables to determine boundaries of the primary partitions (i.e., volumes or secondary partitions). With respect to the extended or secondary partitions, the mapping module 118 further analyzes the metadata associated with such partitions to determine boundaries (e.g., locations) of one or more logical partitions (i.e., volumes). For example, since the MBR is stored on a first 512 bytes or one sector of a first virtual drive file of the virtual disk and remaining sectors on a track are not used, a first sector of an active primary (e.g., system) partition of the virtual disk has a location of sixty-three sectors or Cylinder 1, Head 1; Sector 0 relative to the first sector or beginning of the first virtual drive file in the virtual disk. Furthermore, the MBS indicates that the active primary partition has a size of 794241 sectors and a last sector has a location of Cylinder 196; Head 63; Sector 63. Hence, the primary active partition may be addressed from sector 1 to sector 794178 relative to a beginning or boundary of the primary active partition or volume. Similarly, the mapping module 118 determines boundaries for any remaining primary or secondary partitions indicated by the MBR.

In another embodiment, the mapping module 118 examines a file system structure of the virtual volume (e.g., Master File Table (MFT), File Allocation Table (FAT), iNodes and the like) to determine the first locations of the file system objects 124 relative to the virtual volume. In one embodiment, the file system structure comprises extent information for a plurality of extents that form the plurality of file system objects 124. For example, a MFT associated with the primary active partition (i.e., the virtual volume) from the above paragraph comprises resident and non-resident attribute information for file and directories. Accordingly, the mapping module 118 and/or the driver 116 determine locations of the extents for the files and directories relative to the primary active partition (i.e., the extents addressed from sector 63 to sector 794178).

In yet another embodiment, the mapping module 118 uses the configuration information and the partition information to associate the virtual drive files with one or more partitions and/or volumes of the virtual disk. Such associations indicate boundaries of the virtual drive files in relation to the boundaries of the partitions or volumes. Based on such associations, the mapping module 118 uses the extent information from the file system structure to map a file to one or more extents relative to the virtual drive files.

As an example, if two virtual drive files are in a flat format and an extent for a FileA has a first offset relative to the (virtual) volume and a first size, the mapping module 118 translates or adjusts the first offset into a offset relative to a first sector of the first virtual drive file instead of the first sector of the volume. Consequently, the first sector relative to the volume is most likely after the first sector of the first virtual drive file. Furthermore, the mapping module 118 adjusts the first size to be a number of sectors from the offset to a location of a last sector of the first virtual drive file. In addition, if the first size of the extent exceeds the location of the last sector of the first virtual drive file and spans into a second virtual drive file, the mapping module 118 subtracts a size (or an offset) of the first virtual drive file from the size of the extent leaving a smaller extent with an offset at a first sector of the second virtual drive file. As a result, the mapping module 118 translates a location of the extent relative to the virtual volume into two locations of two smaller extents (i.e., portions of the larger extent) relative to the first virtual drive file and the second virtual drive file. Subsequently, the mapping module 118 stores the two locations of the two smaller extents in the map 138 to be used for a restoration process.

The restore module 120 performs file-level restoration from the virtual drive files within the image 134, which is enabled through the map 136. In one embodiment, the restore module 120 examines the map 136 to determine locations of one or more extents relative to the virtual drive files within the image 134. The one or more extents form a particular file system object that is to be restored. The restore module 120 accesses and extracts the one or more extents from the image 134. The restore module 120 communicates the one or more extracted extents to the host computer 102 to restore the particular file system object to the storage volume 122.

Figure 2:
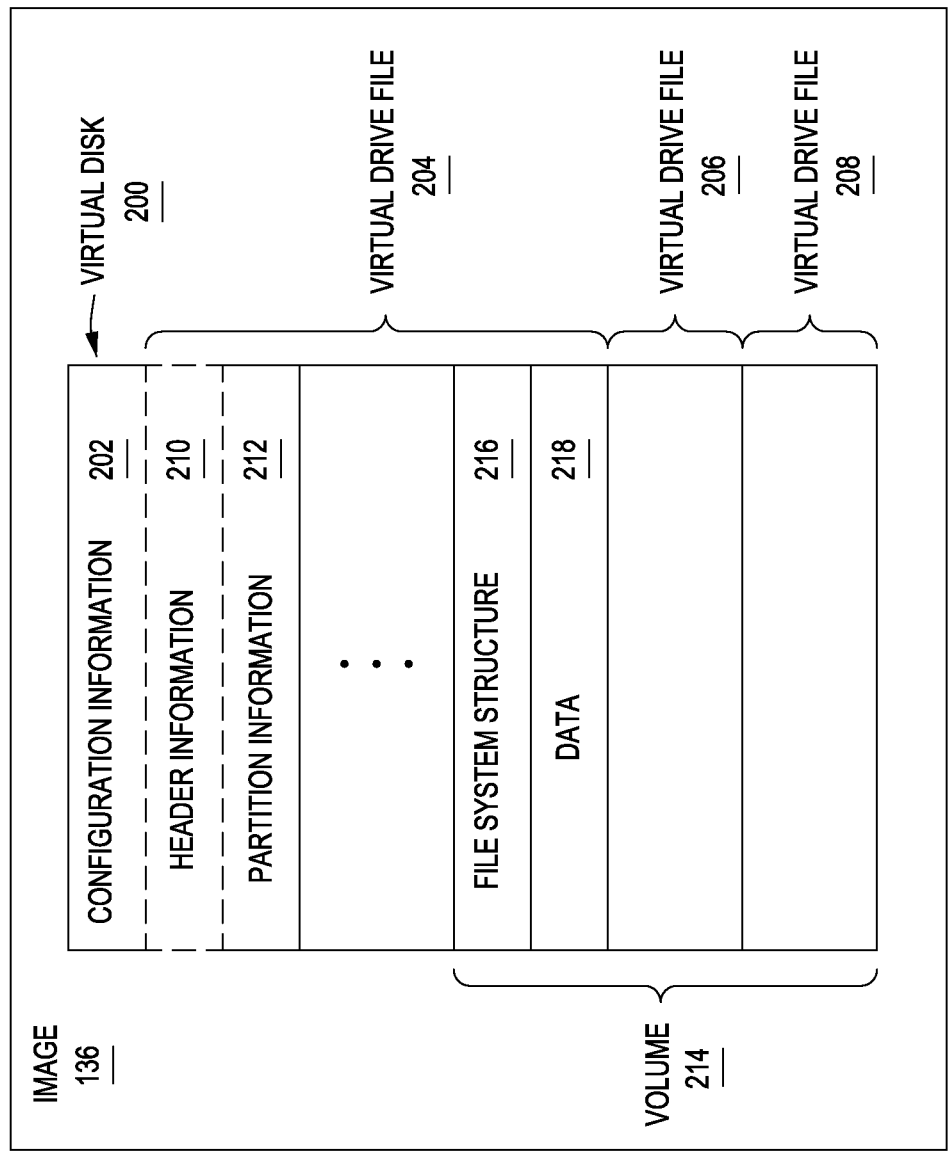
FIG. 2 is an illustrative example of an image of a virtual machine according to one or more embodiments of the present invention.

FIG. 2 illustrates an example of the image 136 that is used to restore file system objects according to one or more embodiments of the present invention. In one embodiment, the image 136 is a disk image file of a virtual machine that operates on the host computer 102.

The image 136 comprises a virtual disk 200 for representing physical storage (e.g., a physical disk). As such, the virtual disk 200 is defined by a geometry and configuration of the physical disk in terms of a number of sectors per track (e.g., 63), a number of heads (e.g., 255), a number of cylinders (e.g., 1024) and a controller type (e.g., SCSI, IDE and LSILOGIC). For example, 63 sectors multiplied by 255 heads and multiplied by 1024 cylinders is 16450560 sectors. Since 512 bytes is equivalent to one sector, there are about 8.4 gigabytes of storage space within the virtual disk 200. Furthermore, the virtual disk 200 may be partitioned such that disk regions or ranges of sectors are associated with one or more physical or logical volumes.

As mentioned above, data within the virtual disk 200 may be encapsulated in a number of formats (e.g., monolithic flat, vfmssparse, vfmsrawdevice and the like). According to one or more formats, the virtual disk 200 comprises metadata (e.g., a descriptor file, configuration file, a .VMX file and the like) and a number of virtual drive files (e.g., VDMK files). The descriptor file comprises the geometry of the virtual disk, as mentioned above, as well as information regarding the virtual drive files (e.g., size (bytes or sectors), address of a first sector (logical, physical or cylinder-head-sector), offset from a first sector in the virtual disk 200, access rights, format, file names and the like). The virtual drive files encapsulate data according to a number of formats (e.g., sparse, flat, vfms and the like). In one embodiment of a flat virtual drive file, the data in the file is a sector by sector copy of a partition of the physical disk.

According to various embodiments, the virtual disk 200 comprises configuration information 202 (e.g., the descriptor file), a virtual drive file 204, a virtual drive file 206 and virtual drive file 208. The virtual drive file 204 comprises partition information 212 as well as a portion of a volume 214. The volume 214 (e.g., a RAID-5 NTFS volume) comprises a file system structure 216 (e.g., a Master File Table (MFT), an iNode, a File Allocation Table (FAT) and the like) and data 218. The data 218 continues into the virtual drive file 206 and the virtual drive file 208. The partition information 212 (e.g., information within a Master Boot Record (MBR), an Extended Boot Record (EBR), a Globally Unique Identifier (GUID) Partition Table (GPT), Logical Disk Manager (LDM) and/or the like) indicates or points to locations in the virtual disk 200 that defines boundaries (e.g., a first sector, a last sector and a size) of the volume 214. As FIG. 2 illustrates, the volume 214 spans from a portion of the virtual drive file 204 to the virtual drive file 208 and includes each and every sector within such a span. As described above, the mapping module 118 analyzes the configuration information 202 and the partition information 212 to associate the virtual drive file 204, the virtual drive file 206 and the virtual drive file 208 with the volume 214.

The file system structure 216 organizes and manages a plurality of file system objects (e.g., the file system objects 124 of FIG. 1) that form the data 218 of the volume 214. In one embodiment, the file system structure 216 comprises information regarding resident and non-resident attributes for the plurality of file system objects. As such, the file system structure 216 is used to locate one or more extents of a particular file system object within the volume 214. For example, the file system structure 216 may be a Master File Table (MFT) for a NTFS volume as the volume 214.

Optionally, the virtual disk 200 comprises header information 210 for use in mapping an extent relative to virtual drive files in a sparse format. Generally, a sparse file organizes a plurality of sectors of data in grains, grain tables and grain directories. Hence, the header information 210 comprises grain directory entries and/or grain table entries. In order to access a particular sector in a sparse virtual drive file, a grain directory entry associated the particular sector is accessed and used to locate a grain table. Then, the grain table is used to locate a grain table entry that comprises a location of a grain, which comprises the particular sector. Finally, the grain table entry is used to locate the grain. As mentioned above, the driver 116 and/or the mapping module 118 analyze the header information 210 to determine physical locations of extents within the sparse virtual drive file (e.g., the second locations of file system objects 124). Such physical locations are used to modify a mapping of the file system objects to be relative to the sparse virtual drive file instead of the volume 214.

For example, if the virtual drive file 204, the virtual drive file 206 and the virtual drive file 206 are sparse files and a file comprises two extents within the volume 214, the header information 210 is used to convert first locations of the two extents relative to the volume 214 into second locations of one or more portions the two extents relative to the virtual drive file 204, the virtual drive file 206 and/or the virtual drive file 206. The header information 210 comprises (aggregated) grain directory entries and grain table entries from the virtual drive file 204, the virtual drive file 206 and the virtual drive file 206. Information regarding each extent (i.e., offset and size) is compared with the header information 210 to determine one or more grains that comprise the one or more portions of the two extents. Each determined grain is an area of memory that may be described by an offset from a first sector of the virtual drive file that comprises the grain as well as a size in sectors. Within each determined grain, an offset of at least a portion of either extent is determined. Hence, the locations of various portions of the two extents may be determined by examining the header information 120.

Figure 3:
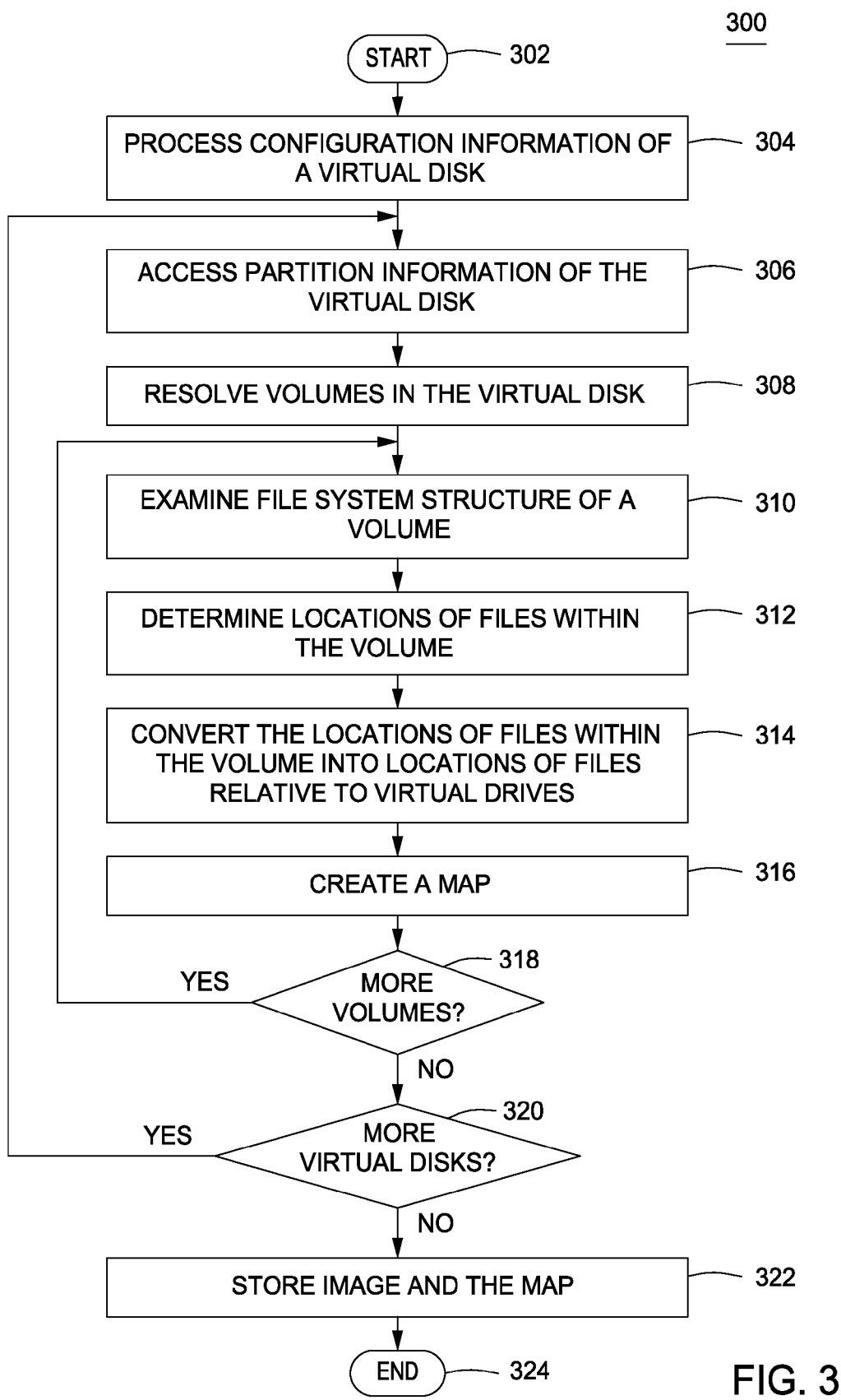
FIG. 3 is a flow diagram of a method for mapping virtual drives according to one or more embodiments of the present invention.

FIG. 3 is a flow diagram of a method 300 for mapping virtual drives according to one or more embodiments of the present invention. The method 300 begins at step 302 and proceeds to step 304.

At step 304, configuration information of a virtual disk is processed. In one embodiment, a descriptor file is used to identify one or more virtual drive files within the virtual disk, as explained above. At step 306, partition information of the virtual disk is accessed. At step 308, one or more volumes in the virtual disk are resolved. In one embodiment, a MBR is processed to determine boundaries for the one or more volumes within the virtual disk, as explained above. Accordingly, the partition information (e.g., the MBR) and the configuration information (e.g., the descriptor file) are used to determine boundaries of the one or more volumes in relation to the one or more virtual drive files.

At step 310, a file system structure of a volume is examined. At step 312, locations of files within the volume are determined. In one embodiment, a MFT associated with the volume is analyzed to determine locations of extents for the files relative to the boundaries of the volume, as explained above. At step 314, the locations of the files within the volume are converted into locations of the files relative to the one or more virtual drives. At step 318, a map is created that comprises the locations of the files relative to the one or more virtual drives.

At step 318, a determination is made as to whether more volumes are stored on the virtual disk. If it is determined that more volumes are stored on the virtual disk, then the method 300 returns to step 310. On the other hand, if it is determined that no more volumes are stored on the virtual disk, then the method 300 proceeds to step 320. At step 320, a determination is made as to whether more virtual disks are stored on an image. If it is determined that more virtual disks are stored on an image, then the method 300 returns to step 306. On the other hand, if it is determined that no more virtual disks are stored on an image, then the method 300 proceeds to step 322. At step 322, the image and the map are stored. In one embodiment, the image and the map are stored in a same location in order to be used to restore a file from the image at a later time using mappings of the file stored in the map. At step 324, the method ends.

Figure 4:
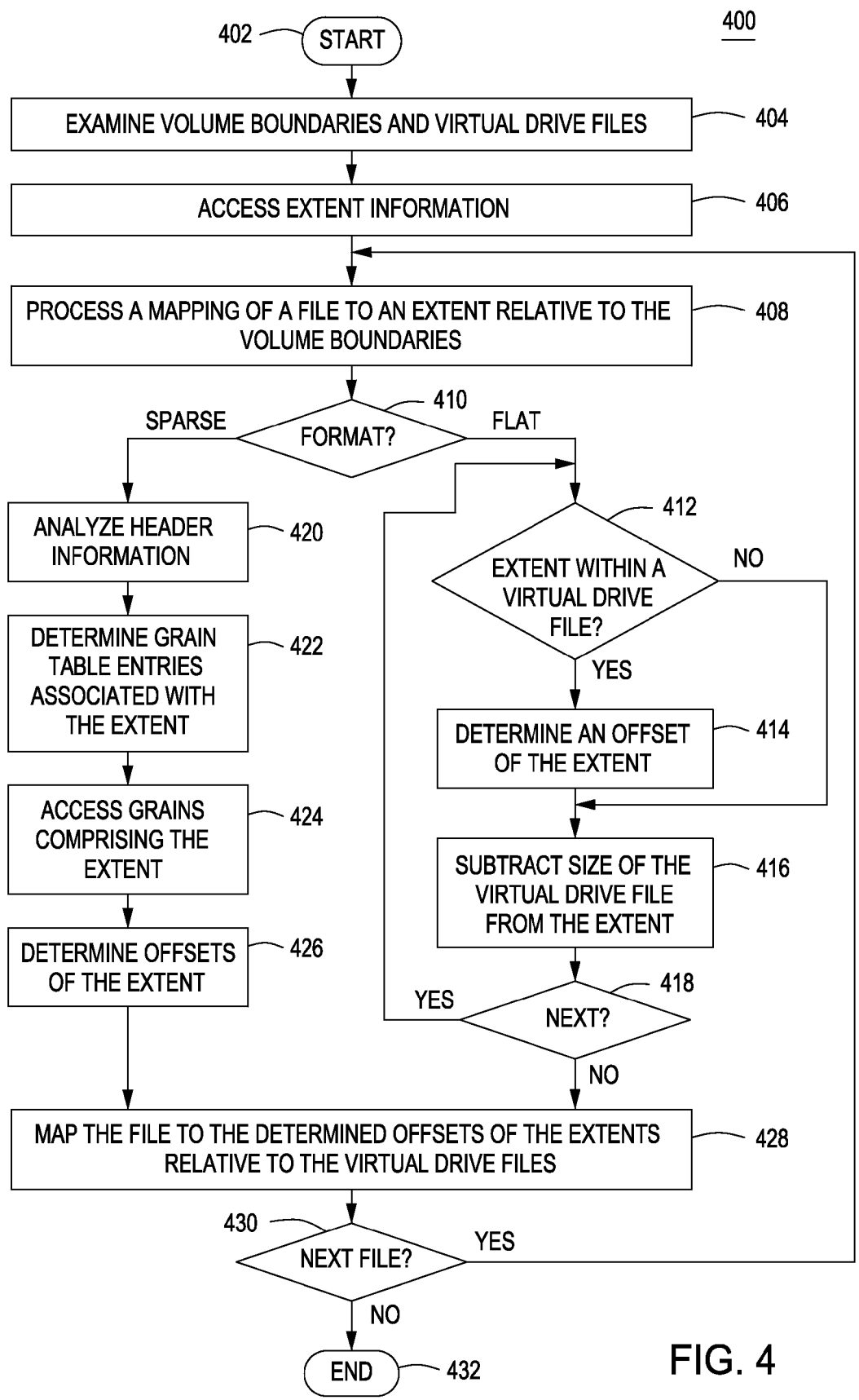
FIG. 4 is a flow diagram of a method for translating a mapping between a file and one or more extents relative to a volume into a mapping between the file and one or more extents relative to one or more virtual drive files according to one or more embodiments of the present invention.

FIG. 4 is a flow diagram of a method 400 for translating a mapping between a file and one or more extents relative to a volume into a mapping between the file and one or more extents relative to one or more virtual drive files. The method 400 is an embodiment of step 314 of the method 300. The method 400 begins at step 402 and proceeds to step 404.

At step 404, volume boundaries and virtual drive files are examined. At step 406, extent information is accessed. In one embodiment, the extent information comprises an offset and a size relative to the volume for each file. At step 408, a mapping of a file to extents relative to the volume boundaries is processed. At step 410, a determination is made as to whether a format of the virtual drive files is sparse or flat. If it is determined that the format of the virtual drive files is flat, the method 400 proceeds to step 412. On the other hand, if it is determined that the format of the virtual drive files is sparse, the method 400 proceeds to step 420.

At step 412, a determination is made as to whether an extent is stored within a virtual drive file. If it is determined that the extent is stored within the virtual drive file, then the method 400 proceeds to step 414. If it is determined that the extent is not stored within the virtual drive file, then the method 400 proceeds to step 416. At step 414, an offset of the extent relative to the virtual drive file (e.g., offset from a first sector of the virtual drive file) is determined. At step 416, a size of the virtual drive file is subtracted from the extent. At step 418, a determination is made as to whether another virtual drive file stores data for the volume. If it is determined that there is another virtual drive file that stores data for the volume, then the method 400 returns to step 412. If it is determined that there are no more virtual drive files that store data for the volume, then the method 400 proceeds to step 428.

At step 420, header information of the virtual drive files is analyzed. In one embodiment, each and every grain directory and grain table of the virtual drive files are analyzed. At step 422, one or more grain table entries associated with the extents are determined. At step 424, one or more grains comprising the extents are accessed. At step 426, one or more offsets of the extents relative to the virtual drive files are determined. At step 428, the file is mapped to the determined offsets of the extents relative to the virtual drive files. At step 430, a determination is made as to whether a file is next in a file system of the volume. If it is determined that a file is next, the method 400 returns to step 408. If it is determined that no file is next, the method 400 proceeds to step 432. At step 432, a method 400 ends.

Figure 5:
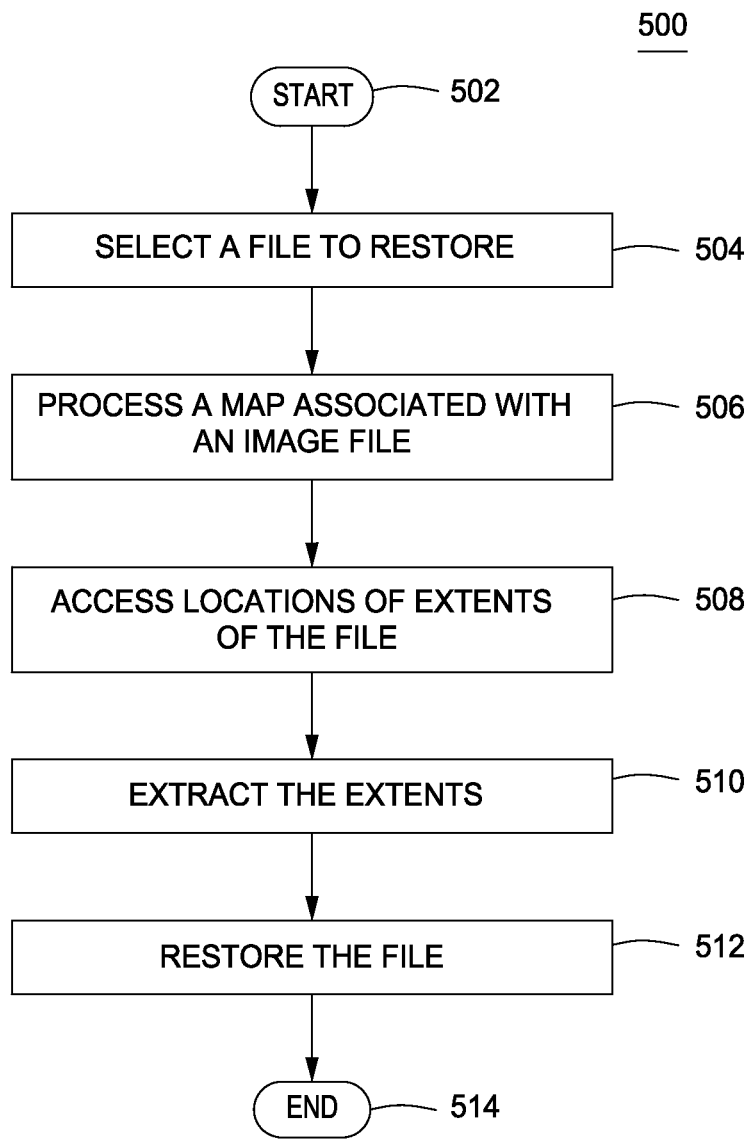
FIG. 5 is a flow diagram of a method for restoring a file from an image using a map according to one or more embodiments of the present invention.

FIG. 5 is a flow diagram of a method 500 for restoring a file using a map according to one or more embodiments of the present invention. The method 500 begins at step 502 and proceeds to step 504.

At step 504, a file is selected to be restored. In one embodiment, a restore module receives a request to restore the file from a user of a host computer (e.g., the host computer 102 of FIG. 1). The restore module identifies an image file that comprises the file. At step 506, a map associated with the image file is processed. At step 508, locations of one or more extents of the file in the map are accessed. At step 510, the one or more extents are extracted using such locations. As mentioned above for FIG. 1, the restore module uses mappings of files to extents relative to one or more virtual drive files to identify and extract files from the image file for restoration. At step 512, the file is restored. In one embodiment, the file is restored to a volume associated with a virtual machine. At step 514, the method 500 ends.

While the foregoing is directed to embodiments of the present invention, other and further embodiments of the invention may be devised without departing from the basic scope thereof, and the scope thereof is determined by the claims that follow.

The invention claimed is:

1. A method, comprising:
    accessing a backup image of a virtual machine, wherein
        the backup image comprises a point-in-time copy of a virtual machine configuration file and one or more virtual drive files, and
        the one or more virtual drive files implement a virtual volume; and
    generating a map that identifies a drive file location of a file system object within the one or more virtual drive files, wherein-the generating comprises
        converting a volume location of the file system object within the virtual volume into the drive file location, and
        the accessing and the generating are performed by a computing device implementing a mapping module.

2. The method of claim 1, wherein the map further comprises a second drive file location of a second file system object within the one or more virtual drive files.

3. The method of claim 2, further comprising storing the map with the backup image.

4. The method of claim 1, wherein the generating further comprises examining partition information associated with the one or more virtual drive files to resolve the virtual volume.

5. The method of claim 4, wherein the examining the partition information further comprises resolving at least one partition of the one or more virtual drive files to generate the partition information.

6. The method of claim 1, wherein the generating further comprises examining file system information associated with a file system implemented in the virtual volume, wherein the file system comprises the file system object.

7. The method of claim 6, wherein the examining further comprises parsing the file system information regarding the file system object to determine indicia of the volume location of the file system object.

8. The method of claim 1, wherein the generating further comprises generating extent information to indicate a volume mapping between the file system object and one or more extents within the virtual volume.

9. The method of claim 8, wherein the generating further comprises modifying the extent information to indicate a drive file mapping between the file system object and one or more extents within the one or more virtual drive files.

10. The method of claim 1, wherein the generating further comprises translating a first offset associated with an extent within the virtual volume into a second offset associated with at least one extent within the one or more virtual drive files.

11. The method of claim 1 further comprising:
receiving a request to restore the file system object;
identifying at least one location of at least one portion of the file system object within the one or more virtual drive files, based upon the map;
extracting the at least one portion of the selected file system object from the backup image using the at least one location; and
restoring the file system object.

12. The method of claim 1, wherein the generating further comprises interpreting a format of the one or more virtual drive files.

13. The method of claim 1, wherein the generating further comprises analyzing a descriptor associated with the one or more virtual drive files.

14. A non-transitory computer readable storage medium, comprising program instructions executable to implement:
a driver for interpreting a format of at least one virtual drive file included in a backup image of a virtual machine, wherein
the at least one virtual drive file implements a virtual volume,
the virtual volume comprises a plurality of file system objects,
the format comprises indicia of locations of a plurality of extents within the at least one virtual drive, and
the plurality of file system objects are stored in the plurality of extents; and
a mapping module for generating a map, wherein
the map stores information identifying a drive file location of a file system object of the plurality of file system objects within the at least one virtual drive file, and
the mapping module is configured to convert a volume location of the file system object within the virtual volume into the drive file location.

15. The non-transitory computer readable storage medium of claim 14, wherein the program instructions are further executable to implement a restore module for extracting the file system object of the plurality of file system objects from the backup image using the map, wherein the map comprises the locations of the plurality of file system objects in the at least one virtual drive file.

16. The non-transitory computer readable storage medium of claim 14, wherein the mapping module translates the locations of the plurality of extents within the at least one virtual drive file into the locations of the plurality of file system objects within the virtual volume.

17. The non-transitory computer readable storage medium of claim 14, wherein the driver analyzes a descriptor associated with the at least one virtual drive file to determine the format of the at least one virtual drive file.

18. The non-transitory computer readable storage medium of claim 14, wherein the driver analyzes header information associated with a virtual drive file of the at least one virtual drive file, wherein the header information comprises locations of the plurality of extents within the virtual drive file.

19. A system, comprising:
a host computer, comprising:
a driver for interpreting a format of at least one virtual drive file included in a backup image of a virtual machine, wherein
the at least one virtual drive file implements a virtual volume,
the virtual volume comprises a plurality of file system objects,
the format comprises indicia of locations of a plurality of extents within the at least one virtual drive, and
the plurality of file system objects are stored in the plurality of extents, and
a mapping module for generating a map, wherein
the map stores information identifying a drive file location of a file system object of the plurality of file system objects within the at least one virtual drive file, and
the mapping module is configured to convert a volume location of the file system object within the virtual volume into the drive file location;
a storage system, comprising:
a memory comprising the backup image and the map.

20. The system of claim 19, wherein the host computer further comprises a restore module for extracting a file system object of the plurality of file system objects from the backup image using the map.

* * * * *